United States Patent [19]

Tchack

[11] 4,186,217
[45] Jan. 29, 1980

[54] METHOD FOR LOW FAT COOKING AND CONJOINING COOKING RACKS THEREFOR

[76] Inventor: Eli Tchack, 5 Nottingham Rd., Livingston, N.J. 07039

[21] Appl. No.: 907,846

[22] Filed: May 19, 1978

[51] Int. Cl.² ............................................. A23L 1/31
[52] U.S. Cl. ..................................... 426/523; 99/444; 99/450; 99/445; 220/19; 220/85 H; 220/405; 229/3.5 MF; 211/126; 206/513; 206/514
[58] Field of Search ................ 99/446, 445, 444, 450, 99/425; 126/39 M; 220/85 H, 19, 450, 405; 229/3.5 MF; 426/113, 523; 211/126; 206/513, 514

[56] References Cited

U.S. PATENT DOCUMENTS

| | | | |
|---|---|---|---|
| 2,236,992 | 4/1941 | Broadley | 99/446 |
| 2,772,627 | 12/1956 | Newell | 126/39 M |
| 3,127,828 | 4/1964 | Fine | 229/315 MF |
| 3,155,304 | 11/1964 | Beerend | 220/405 |
| 3,211,082 | 10/1965 | Sachnoff et al. | 99/444 |
| 3,292,528 | 12/1966 | Myler | 99/446 |
| 3,419,175 | 12/1968 | Laughlin | 220/19 |
| 3,536,000 | 10/1970 | Whitehall | 99/425 |

FOREIGN PATENT DOCUMENTS

| | | | |
|---|---|---|---|
| 707999 | 4/1965 | Canada | 126/39 M |
| 513130 | 10/1939 | United Kingdom | 99/446 |
| 615022 | 12/1948 | United Kingdom | 99/446 |
| 983612 | 2/1965 | United Kingdom | 99/446 |

OTHER PUBLICATIONS

"Reynolds Wrap", 2/55.

Primary Examiner—Steven L. Weinstein
Attorney, Agent, or Firm—Lerner, David, Littenberg & Samuel

[57] ABSTRACT

Conjoining cooking racks are disclosed which fit together one on top of another to form an upper and lower rack, each having identically sized outside frames, and depending longitudinal cross members connected across said frames. A method for employing the frames in conjunction with metal foil sheets for low fat cooking without soiling the frames is also described.

8 Claims, 5 Drawing Figures

METHOD FOR LOW FAT COOKING AND CONJOINING COOKING RACKS THEREFOR

BACKGROUND OF THE INVENTION

This invention relates to cooking apparatus and methods, and more particularly to apparatus and methods for low fat cooking which use disposable grease collectors.

It is a well-known technique to use metal foil in a cooking pan to prevent soiling of the pan with the food and products of the food being cooked. This is an especially common practice when cooking roasts, fowl and other grease producing foods. Once the food is cooked and removed from the pan, the metal foil is also removed and disposed of. In this manner the pan is not soiled, and no scrubbing of baked-on grease or grit is required. A serious drawback of this approach is that the item being cooked sits in its own grease during the cooking process and thus may have an undesirably large amount of grease saturated within itself when it is removed from the foil-protected pan.

It is therefore an object of the instant invention to provide a method and apparatus for substantially greaseless cooking, wherein the cooked item does not stand in its own grease while cooking.

It is a further object of this invention to provide a method and apparatus for substantially greaseless cooking in which the only items that are soiled with grease during the cooking process are disposable metal foil sheets.

THE SUMMARY OF THE INVENTION

The foregoing and additional objects are obtained in accordance with the principles of this invention by providing two conjoining cooking racks, each of which has an identical outside frame, but which have differing depths of depending cross members. The racks are fashioned so that the outer frame of one sits directly upon the outer frame of the other and the depending cross members interleave so as to permit the upper rack to sit stably and securely above the lower rack.

The method for using these racks for substantially greaseless cooking comprises the spreading of sheets of disposable metal foil on each of the racks and wrapping the outside edge of the foil over the outside frames thereof. Small channels are formed in the surface of the foil on the upper rack by the user. These channels are obtained by the user running his or her fingers along the top surface of the metal foil and between the depending cross members of the rack. Upon completion of the channel making step, the user punches a series of holes with an instrument such as a paring knife or a fork into the bottom of each of the channels. The upper pan, with its channel and punched metal foil intact, is then placed on the lower pan, the metal foil of which remains ungrooved and unpunched. The item to be cooked is then placed upon the upper pan and the whole is placed in an oven. When grease cooks out of the item being cooked, it falls into the channels and drips through the punched holes of the upper foil-covered rack onto the metal foil covering the bottom rack. Upon completion of the cooking, the metal foil sheets are removed from the two racks and are discarded. The racks themselves remain unsoiled and are immediately ready for further use.

BRIEF DESCRIPTION OF THE DRAWING

The foregoing will be more readily understood upon reading the following detailed description in conjunction with the drawing wherein.

DETAILED DESCRIPTION

Figures 1, 2:
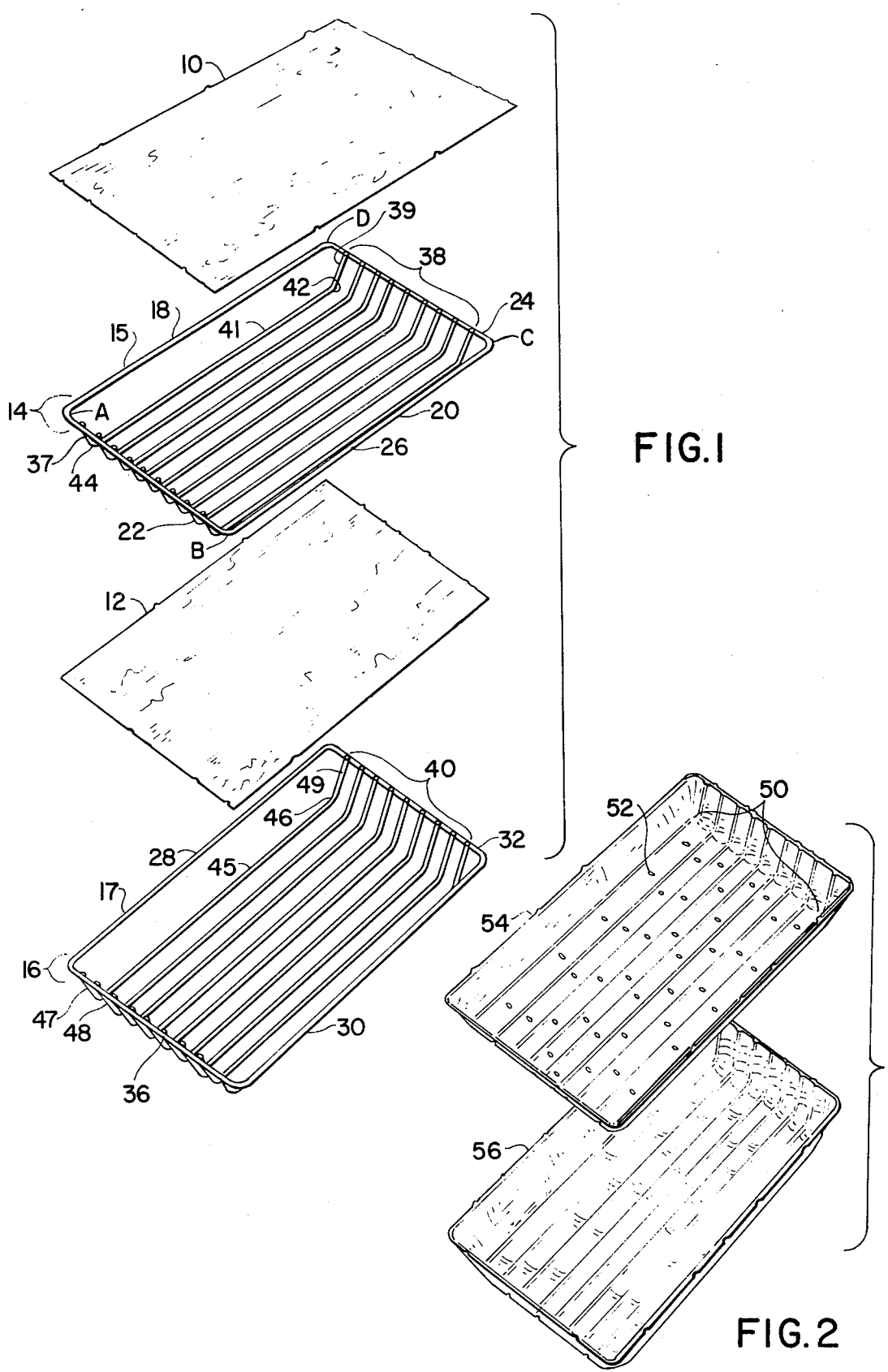
FIG. 1 shows the two trays with their accompanying sheets of metal foil ready to be prepared for use.
FIG. 2 shows the two racks with the metal foil already applied and the channels and holes already made in the foil of the upper rack.

Referring now to FIG. 1, depicted therein is a preferred embodiment of the apparatus of the instant invention including upper rack 14 and lower rack 16. The upper rack outer frame 15 is comprised of side members 18 and 20 and end members 22 and 24 which are preferably made from one piece of round metal stock which is bent at corners A, B, C and D to form a frame of rectangular configuration. The ends of the piece of round metal stock from which the outer frame 15 is made are then welded or otherwise attached together at juncture 26.

The outer frame 17 of lower rack 16 is comprised of side members 28 and 30 and end members 32 and 36. These are formed together into a frame which is identical in construction and shape to the outer frame 15 of the upper rack described above. The reason for making these two outer frames 15 and 17 of identical size and shape is that the upper outer frame 15 will then sit flush upon the lower outer frame 17 when the upper rack 14 is placed on the lower rack 16.

The upper rack 14 has several cross members 38 which are connected between end member 24 and end member 22. These cross members 38 are welded to the inside curved surface of end members 22 and 24, and extend to but not above the plane defined by the upper surfaces of outer frame 15. The lower rack 16 has a similar set of cross members 40 which are attached to end members 32 and 36 in the manner which is the same as described above for attaching cross members 38 to end members 22 and 24.

The cross members 38 are generally U-shaped, with the upwardly extending portions 37 and 39 angling slightly outwardly. Cross members 40 are similarly configured except that the upwardly extending portions 47 and 49 are approximately twice as long as portions 37 and 39.

The horizontally extending portions 41 of cross members 38 are each of a common length defined by the distance between bends 42 and 44. The distance is substantially the same as the distance between bends 46 and 48 which defines the horizontally extending length 45 of each cross member 40. Thus it is seen that the upwardly extending portions 37 and 39 of the cross members 38 form a wider angle with respect to the vertical than do the upwardly extending portions 47 and 49 of depending cross members 40.

The cross members 38 are uniformly spaced along end member 24 and extend in parallel to end member 22. Similarly, cross members 40 are uniformly spaced along end member 32 and extend in parallel to end member 36. As is easily seen from the cross sectional view of FIG. 3, the cross members 38 of the upper rack 14 are offset from the cross members 40 of lower rack 16 so that the two sets of cross members do not obstruct each other when upper rack 14 is set down upon lower rack 16 so that the outer frame 15 of rack 14 sits flush upon the outer frame 17 of lower rack 16.

For use with low fat cooking, a metal foil sheet 10 is placed on the surface described by the cross members 38, and the edges of the sheet 10 are wrapped around the outer frame 15 of upper rack 14. The user then runs his or her fingers along the surface of the metal foil 10 to form the channels 50 shown in FIG. 2 in the metal foil between the cross members 38. Once the user has completed this simple channel making process, he or she punches several holes 52 in the bottom of each of channels 50. The completed ready-to-use upper rack with foil intact is shown in FIG. 2 as upper unit 54.

Metal foil sheet 12 is placed upon the surface described by cross members 40 and wrapped around the outer frame 17 of lower rack 16 to form the lower unit 56 shown in FIG. 2. No channels or holes are needed for this lower unit 56 since its purpose is simply to catch the grease dropped down from the upper unit 54. Sheets 10 and 12 are made of metal foil, such as aluminum foil, which is generally available in a variety of sizes and weights in roll form such that the consumer can easily cut off a desired length from the roll.

Figure 3:
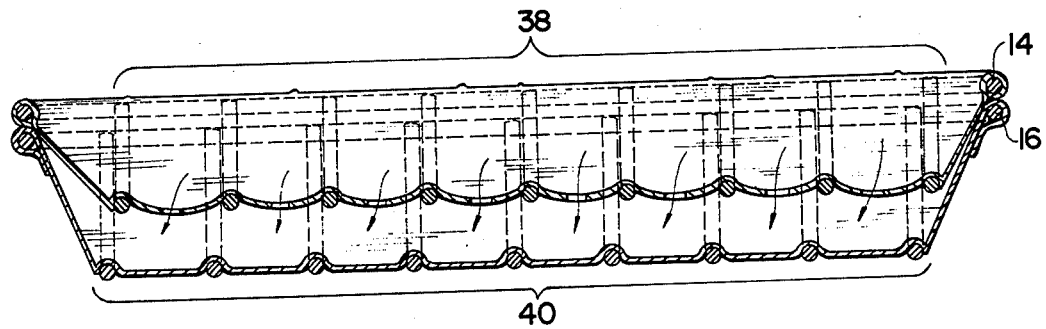
FIG. 3 shows a cross-sectional view taken perpendicular to the direction of extension of the depending cross members showing the two racks with their corresponding metal sheets in place.

When the two racks with foil intact, i.e. units 54 and 56 of FIG. 2, are placed together they form a conjoining low-grease cooking unit shown in cross section in FIG. 3. The set of cross members 38 are, as described above, offset slightly from the cross members 40 as shown in FIG. 3 so that they do not interfere with the proper stable resting of the outer frame 15 of rack 14 on outer frame 17 of rack 16. The upper outer frame 17 sits securely on the lower outer frame 17 with the metal foil of each unit compressed therebetween as shown in FIG. 3.

Figure 4:
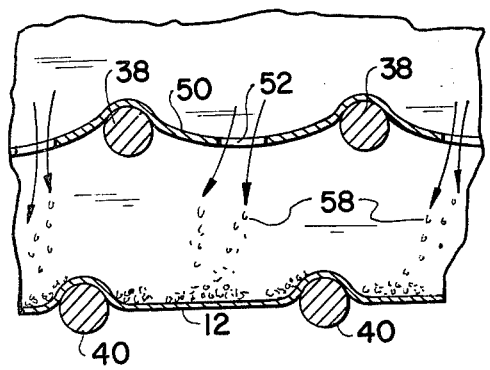
FIG. 4 shows a detailed view of how grease drips from the upper level to the lower level without soiling the depending cross members.

FIG. 4 shows a detailed cross sectional view depicting the manner in which grease drops 58 fall down through holes 52 in the bottom of channels 50 onto the surface of metal foil sheet 12. The grease falling through all the holes 52 in the bottoms of channels 50 will collect (in a manner similar to that shown in FIG. 4) on the surface of lower metal foil sheet 12. It is to be noted from FIG. 1 that cross members 38 as well as cross members 40 are not exposed to contact with the grease droplets 58, and as a result remain unsoiled. This desirable result applies to all of the cross members of both the upper and lower racks.

Figure 5:
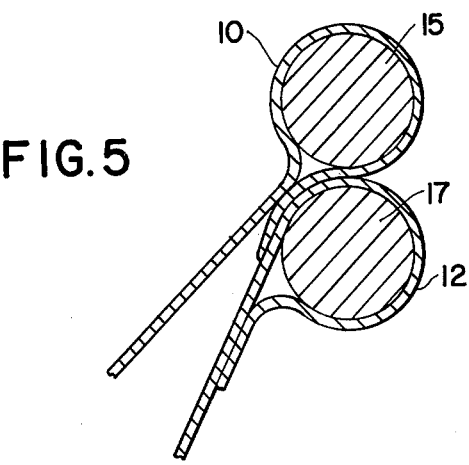
FIG. 5 shows a detailed view of how the outer frame of the upper rack sits on the outer frame of the lower rack.

FIG. 5 shows a detailed cross sectional view depicting how the outer frame 15 sits stably upon the outer frame 17 with the metal foil sheets 10 and 12 compressed therebetween. Upon completion of the cooking of the roast, fowl, fish, etc., the soiled disposable metal foil sheets 10 and 12 are removed from their respective racks by the user, and are discarded. Both the upper and lower racks are immediately ready for further use with no cleaning or scrubbing necessary.

It is to be understood that the above-described arrangement is merely illustrative of the application of the principles of this invention. Numerous other arrangements may be devised by those skilled in the art without departing from the spirit and scope of this invention as defined by the following claims. In particular, for example, the cross sections of the outer frames and cross members are not restricted to a circular shape as shown in FIG. 3, and the number of cross members in the two racks are not restricted to the number shown in the drawing.

What is claimed is:

1. Metallic conjoining cooking racks comprising an upper rack having an outer frame and a plurality of U-shaped cross members connected across and attached to said outer frame; a lower rack having an outer frame substantially identical to said upper rack outer frame and a plurality of U-shaped cross members connected across and attached to said lower rack outer frame; a first metal foil sheet on said U-shaped cross members of said upper rack and a second metal foil sheet on said U-shaped cross members of said lower rack, said first metal foil sheet having a plurality of holes therethrough between said U-shaped cross members of said upper rack and said upper rack set into said lower rack with said upper rack outer frame resting on top of said lower rack outer frame, and with said U-shaped cross members of said upper rack spaced above said second metal foil sheet and said U-shaped cross members of said lower rack a distance sufficient to provide for collection on said second foil sheet of grease which drops through said holes in said first metal foil sheet when food is cooked while supported on said upper foil covered sheet.

2. Conjoining cooking racks according to claim 1, wherein said upper and lower rack outer frames are substantially rectangular in shape, and said U-shaped cross members are uniformly spaced and extend horizontally in parallel with the longitudinal axes of said frames.

3. Conjoining cooking racks according to claim 2, wherein said upper cross members are offset from said lower cross members so that said upper frame seats stably on said lower frame.

4. Conjoining cooking racks according to claim 3, wherein the ends of said U-shaped cross members are attached to the inside surfaces of said outer frames.

5. Conjoining cooking racks according to claim 4, wherein said lower frame cross members extend approximately twice as far down as do said upper frame cross members, and said lower frame cross members extend horizontally a distance substantially equal to the horizontal extension of said upper frame cross members.

6. Conjoining cooking racks, according to claim 4, wherein said upper and lower racks have a constant diameter circular cross section.

7. Conjoining cooking racks according to claim 6, wherein said upper rack cross members are welded to said upper rack outer frame, and said lower rack cross members are welded to said lower rack outer frame.

8. A method for low fat cooking using conjoining cooking racks including the steps of: providing an upper rack having an outer frame and a plurality of U-shaped cross members connected across said frame, said cross members being attached to said outer frame; providing a lower rack having an outer frame substantially identical to said upper rack outer frame, and having a plurality of U-shaped cross members connected across said lower rack outer frame and attached thereto, said upper rack being of a size and shape such that, when said upper rack is set into said lower rack, said upper rack outer frame rests on said lower rack outer frame and said U-shaped cross members of said upper rack are spaced above said U-shaped cross members of said lower rack a distance sufficient to provide for collection of grease on a foil sheet placed on the upper surface of said U-shaped cross members of said lower rack; covering the upper surfaces of each of said racks with separate disposable metal foil sheets; forming channels in said upper rack foil sheet in between said cross members; punching a plurality of holes in the bottom of each of said channels; seating the outer frame of the upper foil covered rack upon the outer frame of the lower foil covered rack; placing an item of food on said upper chaneled and punched foil covered rack; and thereafter cooking said item of food, whereby grease that cooks out of said food item will drop through said punched holes to said disposable foil covered lower rack so that said upper and lower racks remain unsoiled.

* * * * *

UNITED STATES PATENT AND TRADEMARK OFFICE
CERTIFICATE OF CORRECTION

PATENT NO. : 4,186,217
DATED : Jan. 29, 1980
INVENTOR(S) : Eli Tchack

It is certified that error appears in the above-identified patent and that said Letters Patent are hereby corrected as shown below:

Column 4, line 29, "sheet" should read --rack--.

Signed and Sealed this

Thirteenth Day of May 1980

[SEAL]

Attest:

SIDNEY A. DIAMOND

Attesting Officer    Commissioner of Patents and Trademarks